Jan. 31, 1928.  
J. M. DAPRON  
FLUID PRESSURE BRAKE  
Filed April 12, 1927  
1,657,526
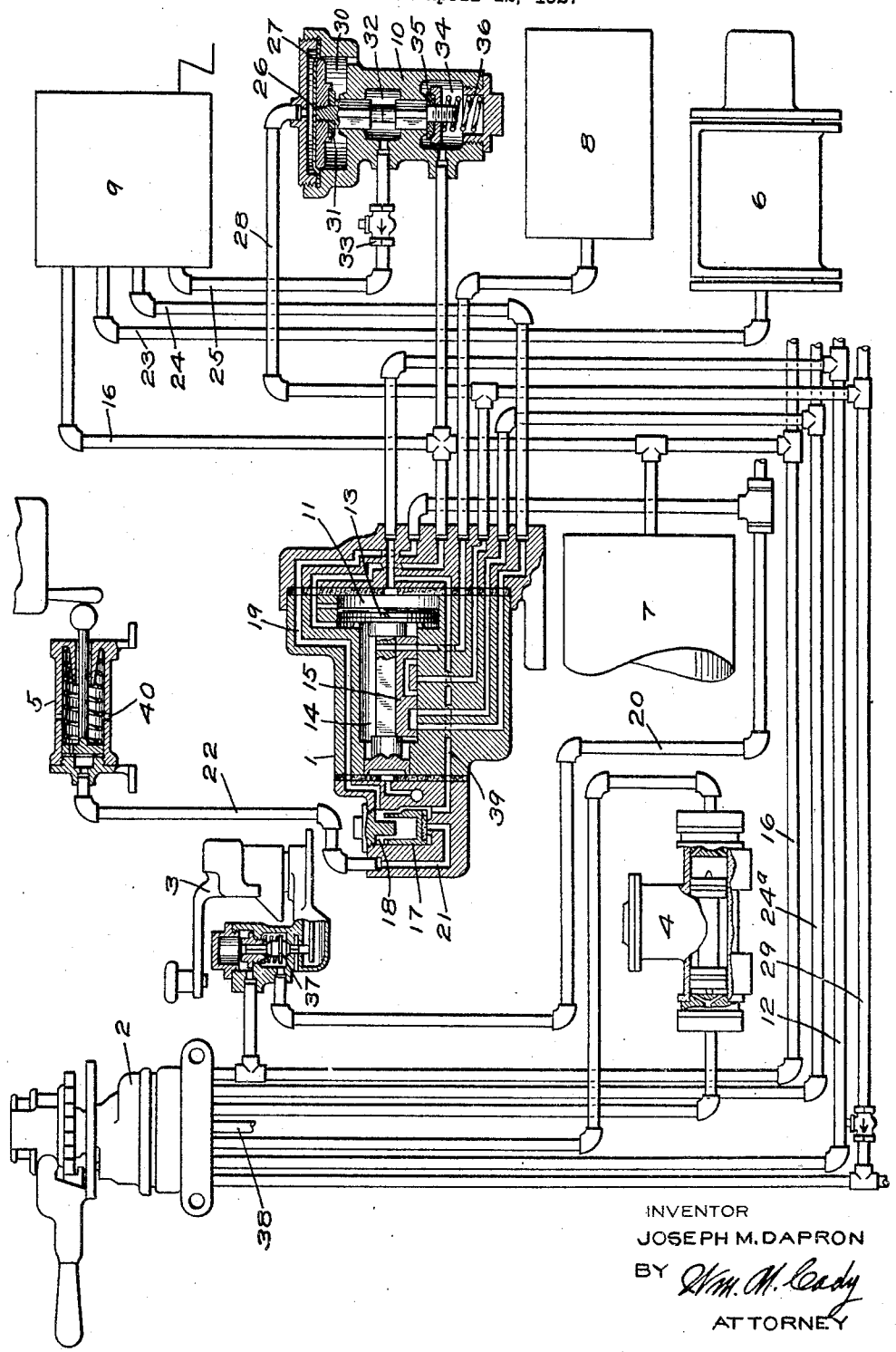
INVENTOR  
JOSEPH M. DAPRON  
BY *Wm. M. Cady*  
ATTORNEY Patented Jan. 31, 1928.

1,657,526

UNITED STATES PATENT OFFICE.

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 12, 1927. Serial No. 183,070.

This invention relates to fluid pressure brakes, and more particularly to a brake equipment of the type known as the "safety car control equipment".

An object of the invention is to provide a "safety car control equipment" with means for varying the braking power according to the load on the car, and in which the parts of the usual "safety car control equipment" are utilized without alteration, to control the variable load braking means.

Another object of the invention is to provide means for varying the braking power according to the load on the car and associated with a "safety car control equipment" in such a manner that the variable load braking means is effective to vary the braking power according to the load on the car when an emergency application of the brakes is made.

Other objects and advantages will appear from the following more detailed description of the invention.

In the accompanying drawing, the single figure illustrates, in diagrammatic form, a fluid pressure brake of the "safety car control" type, embodying the invention.

A "safety car control equipment" of the usual type is shown in the drawing, comprising in general an emergency valve device 1, a brake valve device 2, a safety car controller handle device 3, a door engine 4, a circuit breaker cylinder device 5, a brake cylinder 6, a main reservoir 7, and a sanding reservoir 8. According to my invention there is associated with this "safety car control equipment", a variable load brake mechanism 9 and a relay valve device 10.

The emergency valve device 1 comprises a casing having a piston chamber 11 connected to the emergency brake pipe 12 and containing a piston 13. This device also has a valve chamber 14 containing a slide valve 15 adapted to be operated by the piston 13. The chambers 11 and 14 are both connected with the main reservoir 7 through the pipe 16. A relay valve piston 17 is associated with the emergency valve device and has the piston chamber 18, at one side, connected through a passage 19 and pipe 20, with the safety car controller handle device 3. The opposite side of this relay valve is connected through a passage 21 and pipe 22 to the circuit breaker cylinder device 5.

The variable load mechanism 9 may be of the character shown in United States Letters Patent No. 1,505,950 of Clyde C. Farmer, dated August 26, 1924, and is for the purpose of automatically regulating the maximum brake cylinder pressure, in either a service or an emergency application of the brakes, as the load on the car is increased or decreased. As this mechanism is fully described in the above mentioned patent, a detailed description thereof is deemed unnecessary. As in the construction shown in the patent, the pipe 16 is the pipe through which fluid under pressure from the main reservoir 7 is supplied to the variable load mechanism to effect an emergency application of the brakes, the pipe 23 is the pipe leading to the brake cylinder 6, pipe 24 is the pipe through which fluid under pressure is supplied to the variable load mechanism to effect a service application of the brakes, and pipe 25 is the emergency pipe. The pipe 24 and straight air service pipe 24$^a$ are adapted to be connected through passages in the emergency valve device 1, by the slide valve 15.

The relay valve device 10 may comprise a casing containing a flexible diaphragm 26 having the chamber 27 at one side connected to a pipe 28 connecting with the usual sand pipe 29, and having a chamber 30 at the opposite side open to the atmosphere. A valve 31, movable with the diaphragm 26, controls communication from chamber 30 to a chamber 32 which is connected to the pipe 25, there being a check valve 33 in the pipe. The relay valve device is also provided with a valve chamber 34 connected to the main reservoir pipe 16 and containing a valve 35 which controls communication from this chamber to the chamber 32. The valves 31 and 35 are provided with valve stems adapted to engage so that the movement of the diaphragm 26, or a spring 36 acting upon one of the stems, will operate both valves.

The safety car controller handle device comprises a double seating valve 37, which is movable by the controller handle of the device to effect a connection between the main reservoir pipe 16 and the pipe 20 or to vent the pipe 20 to the atmosphere.

Assuming the emergency valve device 1 to be in normal release position, and brake valve device 2 to be in release position, as shown in the drawing, the brake cylinder is vented to the atmosphere in the usual manner, through the straight air pipe and the exhaust pipe 38 of the brake valve device, and the sanding reservoir is charged with fluid under pressure from the chamber 14 in the emergency valve device, which chamber is connected with the main reservoir.

When it is desired to make an emergency application of the brakes, the brake valve is moved to its emergency position, which causes the emergency pipe 12 and piston chamber 11 of the emergency valve device 1 to be vented, through the exhaust pipe 38, to the atmosphere, so that the fluid under pressure in the chamber 14 of the emergency valve device will cause the piston 13 to shift the slide valve 15 to its emergency position, when such valve will connect the sanding reservoir to the chamber 27 of the relay valve device 10. The fluid under pressure from the sanding reservoir now flows into the chamber 27 of the relay valve device and forces the diaphragm 26, valve stems, and valves 31 and 35 downwardly, causing the valve 31 to seat and close communication between the chambers 30 and 32, and at the same time causing the valve 35 to be unseated, thus permitting fluid from the main reservoir to flow into the chamber 32 and through the check valve 33 and pipe 25 to the variable load mechanism 9. As described in the previously mentioned Patent No. 1,505,950, fluid under pressure supplied through the emergency pipe to the variable load brake mechanism then causes the operation of same, so that fluid under pressure is supplied to the brake cylinder by way of pipe 23, as limited according to the load on the car.

As the sanding reservoir 8 is also connected to the sand pipe 29, the fluid under pressure from this reservoir will escape through the usual sand traps (not shown) which, after a time, reduces the pressure in the sanding reservoir and chamber 27 in the relay valve device to such a degree that the spring 36 of the relay valve device 10, which has been compressed by the downward movement of the valve stem, will, together with fluid under pressure from the main reservoir, force the valve stems and valves 31 and 35 upwardly, thus seating the valve 35 and closing communication between the chambers 34 and 32, and unseating the valve 31 so as to open communication between the chambers 32 and 30 and permitting fluid under pressure in the chamber 32 to flow into the chamber 30 and from thence to the atmosphere. The check valve 33 is adapted to prevent the flow of fluid through the pipe 25, in a direction opposite to that indicated by the arrow in the drawing, so that when the valve 31 is open, the fluid under pressure in the brake cylinder 6 cannot be exhausted to the atmosphere through the chambers 32 and 30 of the relay valve device, which would result in the release of the brakes.

Should the operator remove his hand from the controller handle of the device 3, the valve 37 will be moved upwardly and will permit the fluid under pressure in the chamber 18 at one side of the valve piston 17 of the emergency valve device to exhaust to the atmosphere through passage 19 and pipe 20. Fluid under pressure acting on the outer seated area of valve piston 17 as supplied thereto from the emergency brake pipe 12 through passage 39 in the emergency valve device, will now cause the valve piston 17 to move to its open position, permitting fluid under pressure to flow from passage 39 and the emergency brake pipe 12 through the passage 21 and pipe 22 to the circuit breaker cylinder device 5, causing the piston thereof to be operated to open the power circuit in the usual manner. When this piston has moved a predetermined distance, apertures 40 in the cylinder of the device will be uncovered, which will permit fluid under pressure from the piston chamber 11 of the emergency valve device to exhaust therethrough to the atmosphere, which results in the emergency valve device piston and slide valve moving to their emergency positions, after which the operations of the several parts of the apparatus are the same as hereinbefore described.

If for any reason the relay valve device 10 should fail to function when an emergency application of the brakes is desired, a service application will result, due to the fluid under pressure from the chamber 14 of the emergency valve device flowing into the variable load mechanism through the pipe 24.

When it is desired to make a service application of the brakes, the brake valve is moved to its service position, thus connecting the main reservoir pipe 16 with the service pipe 24ª. With the piston 13 and slide valve 15 in their normal positions, as shown in the drawing, the pipe 24ª will be connected through the emergency valve device 1, slide valve 15 and pipe 24 to the variable load mechanism 9, thus permitting fluid from the main reservoir to flow to the mechanism. As described in the previously mentioned Patent No. 1,505,950, fluid under pressure supplied through the service pipe to the variable load mechanism then causes the operation of same, so that fluid under pressure, supplied to the brake cylinder by the way of pipe 23 is limited according to the load on the car.

As I believe I am the first to combine a variable load device with a "safety car control equipment" in such a manner that an emergency application of the brakes, proportional to the load on the car, may be made, I do not wish to be limited to the specific details and arrangement of the several parts of the invention shown and described herein.

Having now described my invention, what I claim as new and desire to secure by Letters Patent, is:

1. The combination with a "safety car control equipment", of means cooperating therewith for causing an emergency application of the brake proportionate to the load on the car.

2. The combination with a "safety car control equipment", of a variable load mechanism associated with said equipment, and a relay valve device for controlling the flow of fluid under pressure to said mechanism.

3. The combination with a "safety car control equipment", of a variable load mechanism associated with said equipment, and a relay valve device including a valve for controlling the flow of fluid under pressure to said mechanism.

4. The combination with a "safety car control equipment", of a variable load mechanism associated with said equipment, a relay valve device for controlling the flow of fluid under pressure to said mechanism, and means interposed between said variable load mechanism and relay valve device for preventing a return flow of said fluid.

5. In a fluid pressure brake, the combination with a brake pipe, of a reservoir, a variable load mechanism operable by fluid under pressure, a fluid pressure operated relay valve device for supplying fluid under pressure to said variable load mechanism, and an emergency valve device operated upon a reduction in brake pipe pressure for supplying fluid under pressure from said reservoir to said relay valve device.

6. In a fluid pressure brake, the combination with a brake pipe and a brake cylinder, of a variable load brake mechanism operated by fluid under pressure in effecting an emergency application of the brakes for supplying fluid under pressure to the brake cylinder according to the load on the car, a relay valve device for controlling the supply of fluid under pressure to said variable load mechanism in an emergency application of the brakes, and a valve device operated upon a reduction in brake pipe pressure for effecting the operation of said relay valve device.

7. In a fluid pressure brake, the combination with a brake pipe and a brake cylinder, of a variable load brake mechanism operated by fluid under pressure in effecting a service application of the brakes for supplying fluid under pressure to the brake cylinder according to the load on the car and operated by fluid under pressure in effecting an emergency application of the brakes for supplying fluid under pressure to the brake cylinder according to the load on the car, a relay valve device for controlling the supply of fluid under pressure to said variable load mechanism in an emergency application of the brakes, and a valve device operated upon a reduction in brake pipe pressure for effecting the operation of said relay valve device.

8. In a fluid pressure brake, the combination with a variable load mechanism operable by fluid under pressure for effecting an application of the brakes varying in accordance with the load on the car, of a relay valve device for supplying fluid under pressure to said variable load mechanism, and means operable only upon effecting an emergency application of the brakes for operating said relay valve device.

9. In a fluid pressure brake, the combination with a brake pipe, of a sanding reservoir, a variable load mechanism operable by fluid under pressure, a relay valve device for supplying fluid under pressure to said variable load mechanism, said relay valve device including a valve, and means operated upon a reduction in brake pipe pressure for supplying fluid under pressure from said reservoir to said relay valve device to operate said valve.

10. In a fluid pressure brake, the combination with a brake pipe, of a sanding reservoir, a variable load mechanism operable by fluid under pressure, a fluid pressure operated relay valve device for supplying fluid under pressure to said variable load mechanism, means operated upon a reduction in brake pipe pressure for supplying fluid under pressure from said reservoir to said relay valve device, and means associated with said relay valve device operated upon a reduction in sanding reservoir pressure for closing off the supply of fluid under pressure to said variable load mechanism.

11. In a fluid pressure brake, the combination with a variable load mechanism operable by fluid under pressure for effecting an application of the brakes varying in accordance with the load on the car, of a relay valve device for supplying fluid under pressure to said variable load mechanism in effecting an emergency application of the brakes, and means for automatically closing off the supply of fluid to said variable load mechanism when the emergency application of the brakes has been effected.

12. In a fluid pressure brake, the combination with a variable load mechanism operable by fluid under pressure for effecting an application of the brakes varying in accordance with the load on the car, of a relay valve device for supplying fluid under pressure to said variable load mechanism, a sanding reservoir, a valve included in said relay valve device, means operated upon effecting an emergency application of the brakes for supplying fluid under pressure from said sanding reservoir to said relay valve device for opening said valve, and means for closing said valve upon a reduction in sanding reservoir pressure.

13. In a fluid pressure brake, the combination with a brake pipe, of a variable load mechanism operated by fluid under pressure, and a relay valve device adapted to control the supply of fluid under pressure to said variable load mechanism, said relay valve device having a chamber connected with said brake pipe and having a communicating chamber connected with said variable load mechanism, a valve for controlling the communication between said chambers, means for holding said valve normally closed, and means for opening said valve upon effecting an emergency application of the brakes.

14. In a fluid pressure brake, the combination with a brake pipe, of a variable load mechanism operated by fluid under pressure, and a relay valve device adapted to control the supply of fluid under pressure to said variable load mechanism, said relay valve device having a chamber connected with said brake pipe and having a communicating chamber connected with said variable load mechanism, a valve for controlling the communication between said chambers, a spring for holding said valve normally closed, and fluid pressure operated means for opening said valve upon effecting an emergency application of the brakes.

In testimony whereof I have hereunto set my hand.

JOSEPH M. DAPRON.